United States Patent
Hakenberg et al.

(10) Patent No.: US 6,877,038 B2
(45) Date of Patent: Apr. 5, 2005

(54) DATA TRANSMISSION METHOD AND APPARATUS

(75) Inventors: Rolf Hakenberg, Langen (DE); Carsten Burmeister, Langen (DE); Thomas Wiebke, Langen (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/633,574

(22) Filed: Aug. 5, 2003

(65) Prior Publication Data

US 2004/0025184 A1 Feb. 5, 2004

Related U.S. Application Data

(62) Division of application No. 09/796,759, filed on Mar. 2, 2001, now Pat. No. 6,792,470.

(30) Foreign Application Priority Data

Mar. 2, 2000 (EP) .............................................. 00104388

(51) Int. Cl.[7] .............................................. G06F 13/00
(52) U.S. Cl. ........................ 709/232; 709/207; 709/217; 709/237; 709/238
(58) Field of Search ................................ 709/217, 230, 709/231, 232, 237, 238, 207, 213

(56) References Cited

U.S. PATENT DOCUMENTS 5,768,527 A 6/1998 Zhu et al.
5,918,002 A 6/1999 Klemets et al.
6,728,208 B1 * 4/2004 Puuskari .................. 370/230.1

FOREIGN PATENT DOCUMENTS

EP 0 905 976 3/1999
EP 1006689 A2 6/2000
JP 10-126772 5/1998

OTHER PUBLICATIONS

H. Zheng et al. "QoS Aware Mobile Video Communications", Milcom 1999. IEEE Military Communications. Conference Proceedings (CAT. No. 99CH36341), Proceedings of Conference on Military Communications (MILCOM'99), Atlantic City, NJ, USA, Oct. 31, 1999 to Nov. 3, 1999.

* cited by examiner

Primary Examiner—Viet D. Vu
(74) Attorney, Agent, or Firm—Wenderoth, Lind & Ponack, L.L.P.

(57) ABSTRACT

The invention relates to a method and apparatus for transmitting and receiving video data arranged in data frames forming a data stream. Each frame has assigned a priority level. Once a data frame has been transmitted through an unreliable channel and has not been received at the receiver, the priority level of the missing data frame is compared with a priority threshold value, and is then retransmitted if its priority level is greater than the priority threshold value. The retransmission decision is performed either at the transmitting or at the receiving side. According to a preferred embodiment, the priority level of any data frame to be transmitted is compared with the threshold value. The priority decision may involve the calculation of the priority threshold value based on a measurement of the available channel bandwidths and eventually on the bit rate of previously sent frames. The retransmission decision further may include an estimation of the arrival time of the data frame to be retransmitted.

10 Claims, 9 Drawing Sheets

DATA TRANSMISSION METHOD AND APPARATUS

This is a divisional application of U.S. patent application Ser. No. 09/796,759, filed Mar. 2, 2001, now U.S. Pat. No. 6,792,470.

The present invention relates to a data transmission method and apparatus and more particularly to video streaming applications.

In video and multimedia communications many applications exist in which video streams are delivered over non-reliable channels. Examples of such applications include personal computers, TV apparatus and computer cards, MPEG decoders and boards, multimedia transceiver systems and set-top receiver units, DVD devices, video recorders and CCD cameras, video signal equipment, frame grabbers and image capture boards, industrial and medical imaging products, video printers and projectors, or the like. It will therefore be appreciated that many kinds of video streaming applications in the consumer market as well as professional applications exist both in software and hardware.

A video stream consists of a flow of bit-packets called frames that contain information about the video picture itself as well as some meta information such as time stamps. The frames contain the video information in different formats depending on the video compression. Some of these frames can be used independently, so-called intra-coded frames or I-frames, while others depend on the preceding frame, so-called predictive-coded frames or P-frames.

FIG. 1 illustrates a conventional video streaming system. Video server 110 transmits video data through channel 150 to video client 160. For this purpose, the video server 110 includes a transmitter buffer unit 130 which receives video frames with nearly no delay from video source application 120. The bit rate of this internal transmission is only limited by the video source application's bit rate. In the transmitter buffer unit 130 the frames first undergo segmentation, i.e. splitting data packets by lower layer protocols into smaller segments with the number of segments depending on the length of the packet, which is variable and may for instance amount to 200 or 2,000 byte. This segmentation determines one part of the transmission time for the respective packet.

Once the frames have undergone segmentation the segments are sent on the channel in defined time slots according to the available channel bit rate. In unreliable channels 150 bit errors occur and the available channel bit rate varies in time, if the channel is shared by multiple users. This leads to a significant and variable propagation delay.

Access to the channel 150 is given to the transmitter buffer unit 130 by channel access controller 140. As the bit rate of channel 150 is lower than the bit rate of the video stream received from video source application 120, those segments which could not be sent are buffered by the transmitter buffer unit 130 in a first-in-first-out (FIFO) queuing discipline. The transmission buffer unit and the channel access controller are isolated entities and totally independent from the video application. Hence, the video source application 120 does not receive any feedback about the status of the frames as to whether they are already sent or whether they are buffered. All data will be sent by the transmitter buffer unit 130 in the order it arrived.

The segments or PDUs (protocol data units) transmitted by the video server 110 are received by the video client 160 in a receiver buffer unit 170. The receiver buffer unit 170 includes a buffer for storing the received data, and also reassembles the frames from the segments. The video frames are then sent to video display application 180 which might for example likewise be a storage device or the like.

Two main problems occur in video transmissions over unreliable links. The first problem is that because of changes in the channel condition, the bit error rate may increase such that packet loss occurs. Since compressed video streams are extremely susceptible for packet loss, the video quality is decreased dramatically. The second problem may arise from the variable and sometimes very high delay of the video data which might lead to situations in which the delay requirements for the transmission are no longer fulfilled and the video performance again is decreased dramatically.

For reducing the packet loss several mechanisms exist in the prior art. One of these mechanisms is a method called automatic repeat request (ARQ), according to which the loss of a packet is detected in the receiver and the transmitter is informed accordingly. The transmitter then automatically repeats the transmission of the lost packet so that missing video frames are retransmitted. However, not all of the lost packets can be retransmitted because of the delay requirements and/or limited bandwidth of the transport channel. Moreover, such prior art systems lead to a higher delay which might not be tolerable in any case.

A prior art system for overcoming the second problem, i.e. the occurrence of a variable and sometimes very high channel delay, is called Real-Time Transport Protocol (RTP). To control the display times and cope with the real time requirements, this protocol adds some information to the video frames such as time stamps and sequence numbers, encapsulated in RTP packets. This information is used to send the video frames at the right time and in correct sequence. The receiver may perform some measurements, e.g. of delay jitter, and may signal the results to the source by means of the RTP control protocol (RTCP).

One approach to deal with both problems, i.e. packet loss and channel delay, is to improve the RTP technique such that only the I-frames are retransmitted and that before sending any frame a judgement is made whether the retransmitted I-frame would still arrive in time. Such integration of retransmission mechanisms in the RTP technique can be for instance done by using multi-purpose acknowledgement (MACK) packets which can be extended by protocol-specific fields. By restricting retransmission to I-frames and introducing a timer-based judgement for deciding whether to send a frame or to discard it, both problems are addressed, leading to an increased video quality because more frames can be displayed. The delay is kept in a reasonable range by discarding "old" frames, i.e. frames that would be received after expiration of their display time.

Such systems however, would have a significant degree of inadaptability because the retransmissions are limited to the I-frames even when enough free bandwidth is available to retransmit all frames. In certain channel conditions many correctly received P-frames are discarded at the video client, because the preceding P-frame was not received correctly.

Moreover, such techniques perform poorly because frames are sent which should have been discarded and vice versa. This is because the judgement whether to send a frame or to discard it is based on a fixed estimated transmission time which is set at the beginning of the transmission for every packet and is the same for all the packets, being independent of the channel status and the respective packet length. The fixed estimated transmission time is needed to calculate the time at which the frame would be received.

A similar method for selectively retransmitting missing data packets of a data stream is disclosed in U.S. Pat. No. 5,918,002. Retransmission is prioritized based on data types of the data packets. For example, since parent I-frames are needed to render dependent child P-frames, data packets which include I-frames are assigned higher priority for transmission and/or retransmission over data packets which include only P-frames. Moreover, the sequence of retransmission requests is priority-dependent.

Another technique which is concerned with resuming playback taking into consideration the different importance of I- and P-frames is disclosed in U.S. Pat. No. 5,784,527.

In U.S. Pat. No. 5,768,527 it is disclosed that upon detection of a lost packet the client device requests a number of multiple copies of the lost packet, with said number depending on the importance of the lost frame.

The mentioned prior art, however, leads to the above-described disadvantages when transmitting video data through an unreliable channel, that is, a reduced video stream quality due to a restricted capacity and because the prior art techniques may use the channel bandwidth inefficiently.

It is therefore the object of the invention to provide a method and an apparatus for receiving and transmitting video data forming a data stream leading to increased video quality when being operated on an unreliable channel.

This object is solved according to the invention as defined in the independent claims.

According to the invention, retransmission of lost data frames is performed based on a comparison of the priority level of the frame with a threshold value. This goes beyond the teaching of the prior art in that not only I-frames may be retransmitted. Consequently, by providing a priority threshold, the invention allows for adapting the transmission capability to a number of factors including actual channel properties. According to a preferred embodiment, the priority level of any data frame to be transmitted is compared with the threshold value. With the invention it is therefore possible to increase the video quality even when the priority threshold value is fixed.

The invention is therefore in particular advantageous when applied to compressed video (e.g. MPEG-4) streaming transmissions over unreliable (e.g. wireless) links.

Comparing the priority level of the missing data frame with a threshold value and transmitting the frame on the basis of the comparison result may advantageously be performed at the server side as well as the client side. If the decision is made in the client there is no need to send retransmission requests in those cases where the decision is denied, but the priority of the actual frame has to be transmitted. This leads to a most efficient use of the channel bandwidth in uplink direction, however the transmitted data in downlink direction is slightly increased. On the other hand, when the transmission decision is done on the server side, the server receives feedback information which might be valuable. Moreover, the client would advantageously be more inexpensively constructed.

Preferred embodiments of the invention are additionally provided.

If the transmission decision is done on the server side, it is advantageous when the client's retransmission requests include the reception times and frame lengths of two preceding data frames. Using this information, the server would be in the position to most efficiently update his knowledge about the channel state, keep the delay requirements and use the channel bandwidths.

Moreover, since in contrast to the prior art systems the transmission time of the packets is measured during the video streaming, they are no longer assumed to be the same for all packets. Changes in the transmission time may therefore lead to a dynamic adaptation of the video stream quality to changing channel conditions.

Independently of whether the transmission decision is performed on the transmitter or on the receiver side, priority levels are assigned to the data frames preferably based on the logical depth of multidependency. By this measure it is incidentally taken into consideration that those frames which are independent (I-frames) are the most important frames, whereas dependent frames are less important. Moreover, in contrast to the prior art, even the group of dependent frames is divided into more important and less important frames. This allows for fine tuning the retransmission behaviour to an extent which is not known from the prior art.

Another advantage of the present invention is that the improvement of the video quality may be increased by making the transmission decision dynamically. This is done according to a preferred embodiment of the invention by calculating the priority threshold value based on the measured available channel bandwidth. Additionally, the measured sending bit rate may be used. Consequently, the compensation for missing packets may be improved once again.

Furthermore, the invention may be combined with the requirement that a lost frame is retransmitted only when it is expectable that the retransmitted frame will still arrive in time. In particular in cases where the channel bandwidth is shared between several users or applications it is very important to transmit as little data as possible. This is true in particular because the user might pay for the used bandwidth, i.e. the transmitted bits. If there are video packets retransmitted which would not reach the receiver in time because of the high utilization of the channel, bandwidth is wasted. This bandwidth could be used either for the retransmission of frames which have a higher priority or by other users or applications.

The invention will now be described in more detail with reference to the accompanying drawings, in which.

Figure 1:
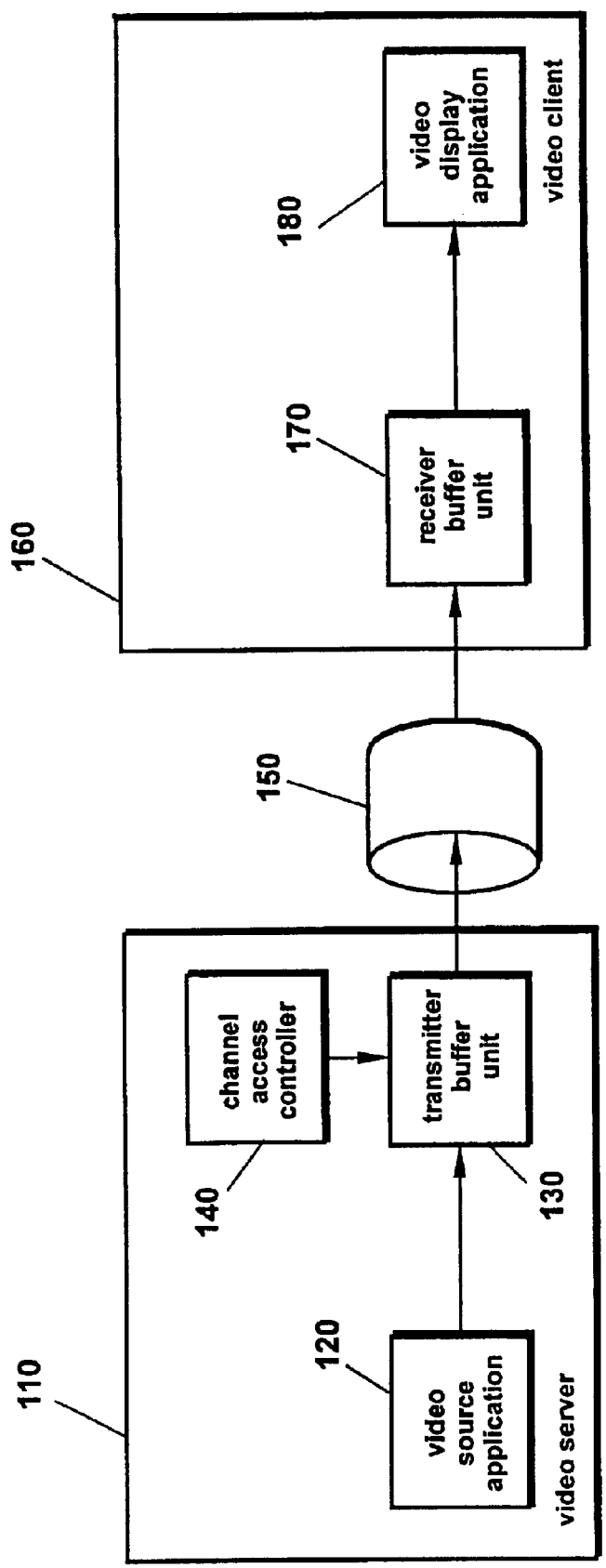
FIG. 1 is a prior art video streaming system.
Figure 2:
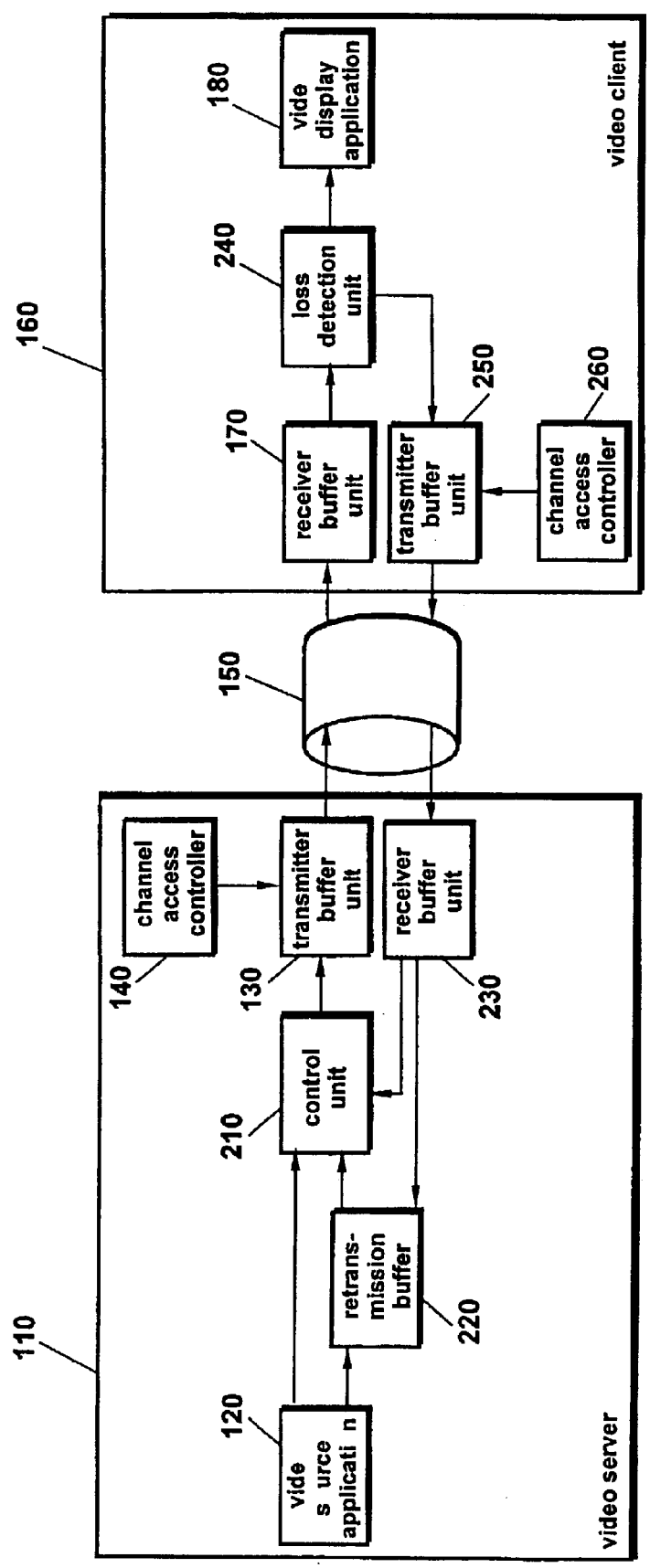
FIG. 2 is a video streaming system according to a preferred embodiment of the invention.

Referring now to FIG. 2, the video server 110 includes a video source application 120, a transmission buffer unit 130 and a channel access controller 140 which function substantially as described in the context of the prior art video streaming system of FIG. 1. Similarly, the video client 160 includes a receiver buffer unit 170 and a video display application 180. Data are sent from the video server 110 to the video client 160 through channel 150.

The video client 160 further comprises loss detection unit 240, which is connected to the receiver buffer unit 170. Once the loss detection unit 240 detects that a frame is missing, it generates a retransmission request which preferably includes the reception times and frame lengths of two preceding data frames. For this purpose, the loss detection unit 240 stores during normal operation the time stamp and length of the most recent two packets. Once the retransmission request has been generated, which might be a negative aknowlegment (NACK) or a multi-purpose acknowledgement (MACK) packet, the request undergoes segmentation by transmitter buffer unit 250 and is sent under control of channel access controller 260 through channel 150 to video server 110.

In the video server 110, receiver buffer unit 230 receives the data and reassembles the request. The request is then forwarded to control unit 210, and to the retransmission buffer 220. The retransmission buffer buffers the I- and P-frames sent from the video source application 120 to the transmitter buffer unit 130 for retransmission purposes.

The control unit 210, upon receiving the time and length information of the two most recent packets, updates the priority thresholds. When receiving video frames from the video source application 120 or the retransmission buffer 220, it performs the transmission decision on the basis of the priority levels assigned to the data frames. The assignment of priorities to frames is illustrated in more detail in FIG. 3.

Figure 3:
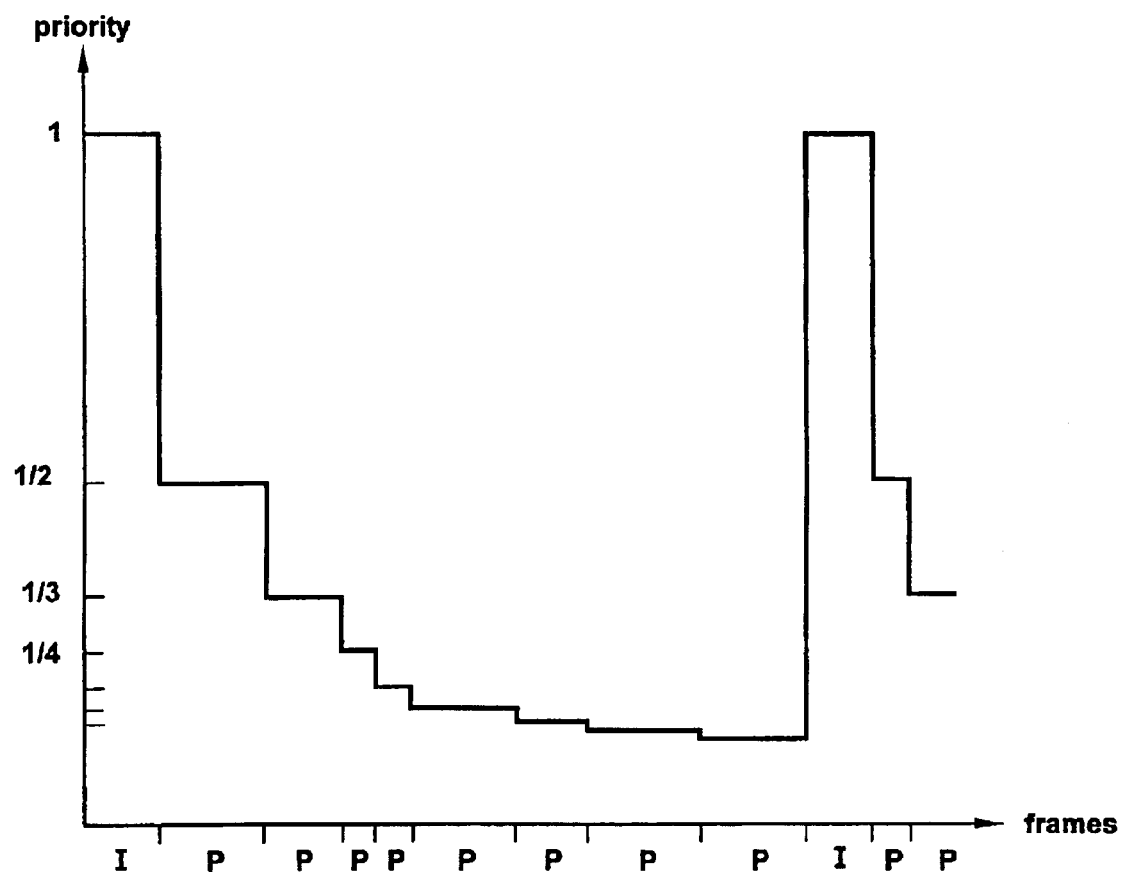
FIG. 3 is a graph illustrating the priority assignment to the frames according to the preferred embodiment of the invention.

As apparent therefrom, according to the present invention I-frames have been given the highest priority since an I-frame can be displayed by video display application 180 independently from other frames. The first P-frame which closely follows the I-frame depends only on the preceding I-frame. The second P-frame depends on the first P-frame, and since the first P-frame depends on the I-frame, the second P-frame is two-fold dependent and therefore less important than the first P-frame. This scheme may be adopted for the following P-frames so that P-frames with higher depth of multidependency, i.e. later P-frames, are more unimportant and are therefore given the lower priority levels. In the embodiment of FIG. 3 the priority is set to 1/n for the n-th P-frame. It will however be appreciated by those of ordinary skill in the art that another functional dependency may be chosen.

Figure 4:
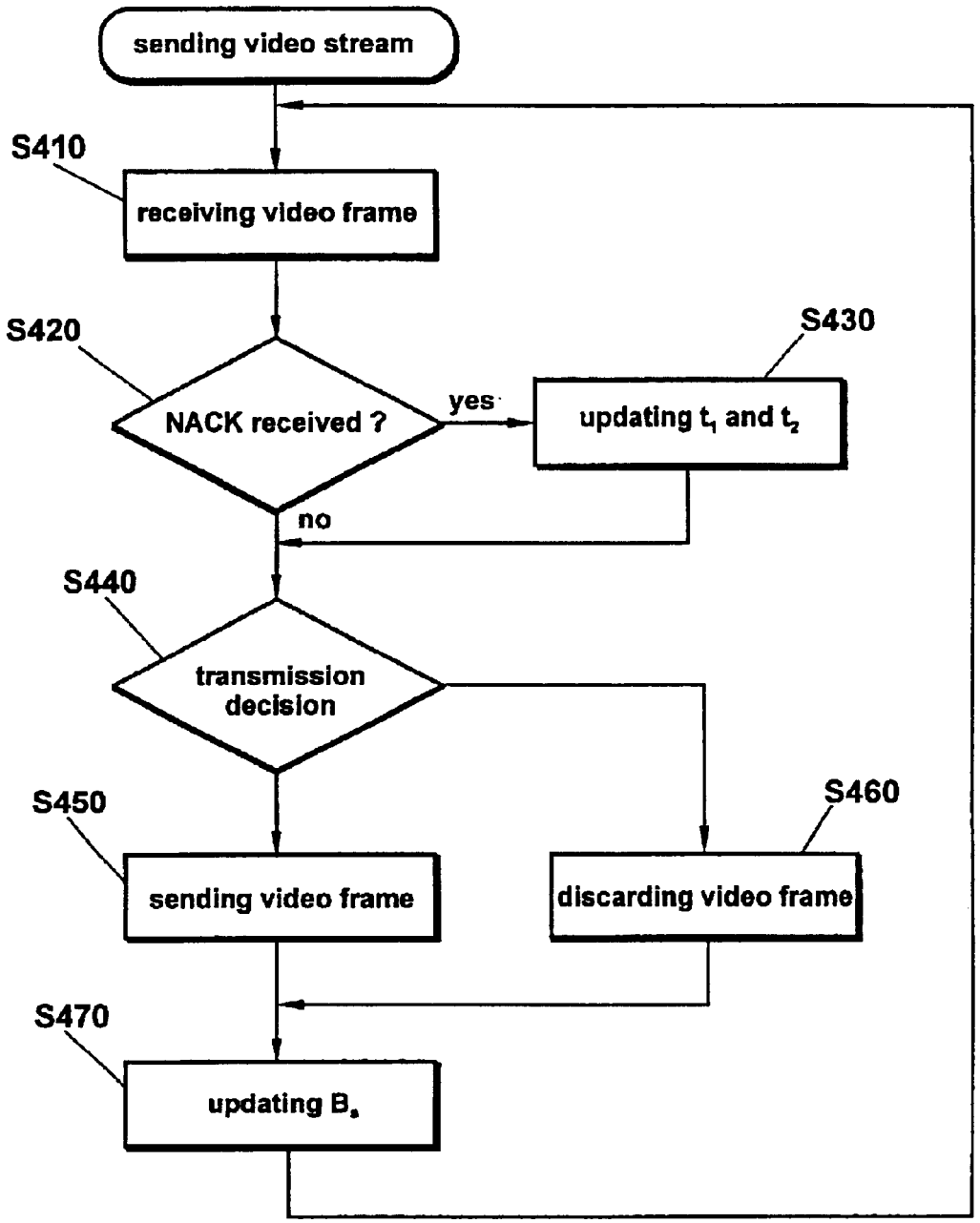
FIG. 4 is a flow chart illustrating the process of sending a video stream.

Referring now to FIG. 4, the process of sending a video stream includes the step of receiving a video frame from the video source application 120 (step 410). Then it is checked in step S420 whether a retransmission request has been received. If no retransmission request has been received, the process proceeds with step S440, otherwise the information from the retransmission request is used to update the channel estimation first (step S430). In step S440 the transmission decision is made, which will be described in detail in the next figures.

The transmission time of a frame consists of two parts. One part is independent of the length of the frame, whereas the other part is length dependent. The frame-length independent time consists mainly of the network delay, i.e. the propagation delay, and the buffering delay due to congestion. In contrast, the frame-length dependent delay is determined by the segmentation and the available bandwidth. The following equation describes the transmission delay of frame r.

$$D_1 = t_1 + l_1 \cdot t_2,$$

where $D_1$ is the transmission delay, $l_1$ is the frame length in bits, $t_1$ is the frame-length independent time, and $t_2$ is the frame-length dependent time per bit.

Assuming that the times $t_1$ and $t_2$ are nearly constant between two packet arrivals, the equation can be resolved when the transmission delays $D_1$ and $D_2$ of two preceding frames have been previously measured:

$$t_1 = \frac{D_2 l_1 - D_1 l_2}{l_1 - l_2},$$

$$t_2 = \frac{D_1 - D_2}{l_1 - l_2}.$$

It is consequently possible to calculate the transmission delay of a missing frame from the times $t_1$ and $t_2$ which are evaluated on the basis of the transmission delays of two preceding frames. For this purpose, loss detection unit 240 stores the reception times and packet lengths of the most recent frames. If an error occurs, these values and the values of the missing or erroneously received frame are transmitted to the video server 110. This can be done either by attaching a Receiver Report to the NACK packet or by using a MACK packet. The overhead added by supplementing the NACK or MACK packet with such additional information is negligibly small.

If it is decided in step S440 that the frame should be discarded, the process proceeds with step S460. If the frame should be sent to the transmission buffer 130, step S450 is executed. Then the sending bit rate is updated in step S470 and the control unit 210 will wait for the next frame to receive from the video source application 120 or the retransmission buffer 220 (step S410).

Figure 5:
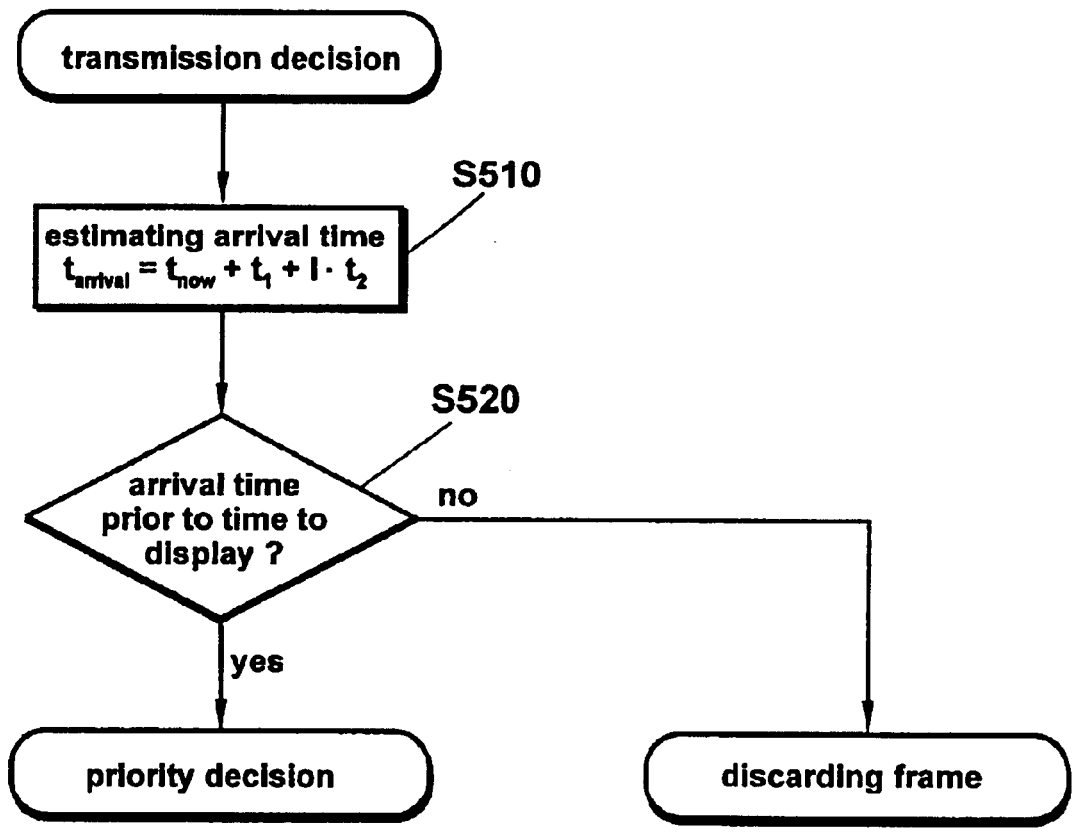
FIG. 5 is a flow chart illustrating the retransmission decision in the process of sending a video stream as depicted in FIG. 4.

The transmission decision of step S440 will now be explained in more detail with reference to FIG. 5. Before comparing the priority with a threshold value, a mechanism is introduced to decide whether the frame should be sent or discarded according to an estimated arrival time since it is not necessary to send frames that are already too late. For that purpose, the arrival time of the frame is estimated, i.e. the transmission delay is calculated in step S510.

If it is then determined in step S520 that the estimated arrival time is later than the desired time to display the video frame, the frame will be discarded instead of being transmitted. Otherwise, control unit 210 evaluates the priority of the missing frame as will be now explained in more detail.

Figure 6:
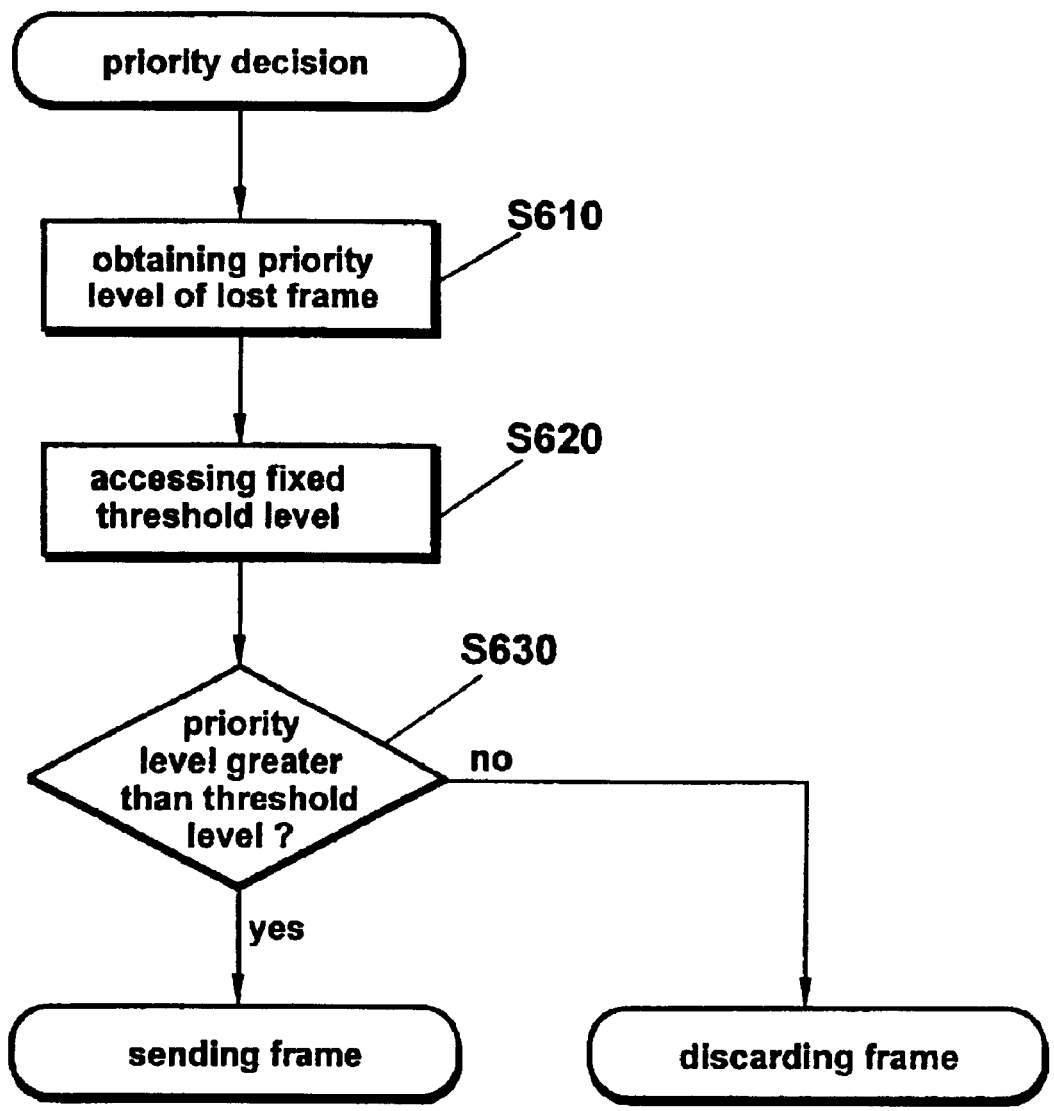
FIG. 6 is a flow chart illustrating a first example of the priority decision being part of the retransmission decision depicted in FIG. 5.

Referring now to FIG. 6, control unit 210 first obtains the priority level of the frame in step S610, and then accesses the fixed threshold level in step S620. There should be two different priority levels. One for frames transmitted for the first time (possibly all frames are transmitted for the first time) and for the retransmissions. The fixed threshold levels have been defined at the time of transmission set-up according to the channel condition and video bit rate at that time. It is then decided in step S630 whether the priority level of the frame exceeds the priority threshold level. Only if this is the case, the frame is transmitted. Otherwise, it is decided to discard the frame.

Figure 7:
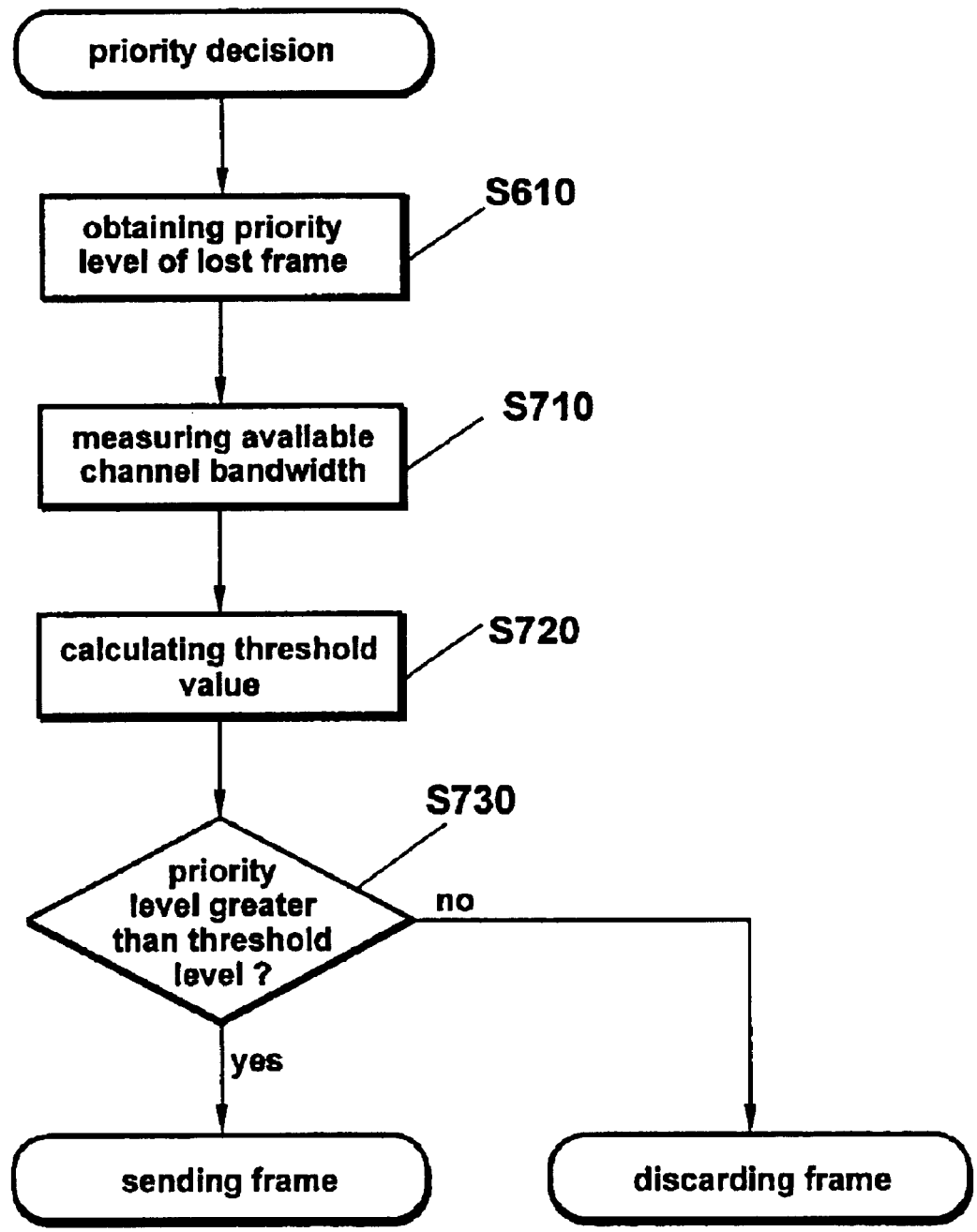
FIG. 7 is a flow chart illustrating a second example of the priority decision.

While this advantageously involves a minimum overhead and implementation effort only, it may be improved as apparent from FIG. 7. The process illustrated in FIG. 7 differs from that of FIG. 6 mainly in that not a fixed threshold level is used but that the priority threshold is calculated based on the measured available channel bandwidth (steps S710, S720). This scheme is based on the idea that, if only a small bandwidth of the channel is available, it might be better to send frames with higher priority only.

Since the available bandwidth is the reciprocal of $t_2$, the measurement of the available channel bandwidth can make use of the above-mentioned measurement of transmission delays:

$$B_{ch} = \frac{1}{t_2}.$$

The available channel bandwidth $B_{ch}$ measured in step S710 is then used in step S720 to calculate the priority threshold value $P_{th}$ according to the following equation:

$$P_{th} = k \cdot \frac{B_v}{B_{ch}}$$

where $B_v$ is the bandwidth needed for the video transmission if no retransmissions are performed at all, and k is a factor to adapt the mechanism to the system and the bit error rate which is assumed to be fixed for the transmission. There should be two different k-factors. One for transmissions for the first time (possibly all frames should be transmitted for the first time) and one for the retransmissions.

Figure 8:
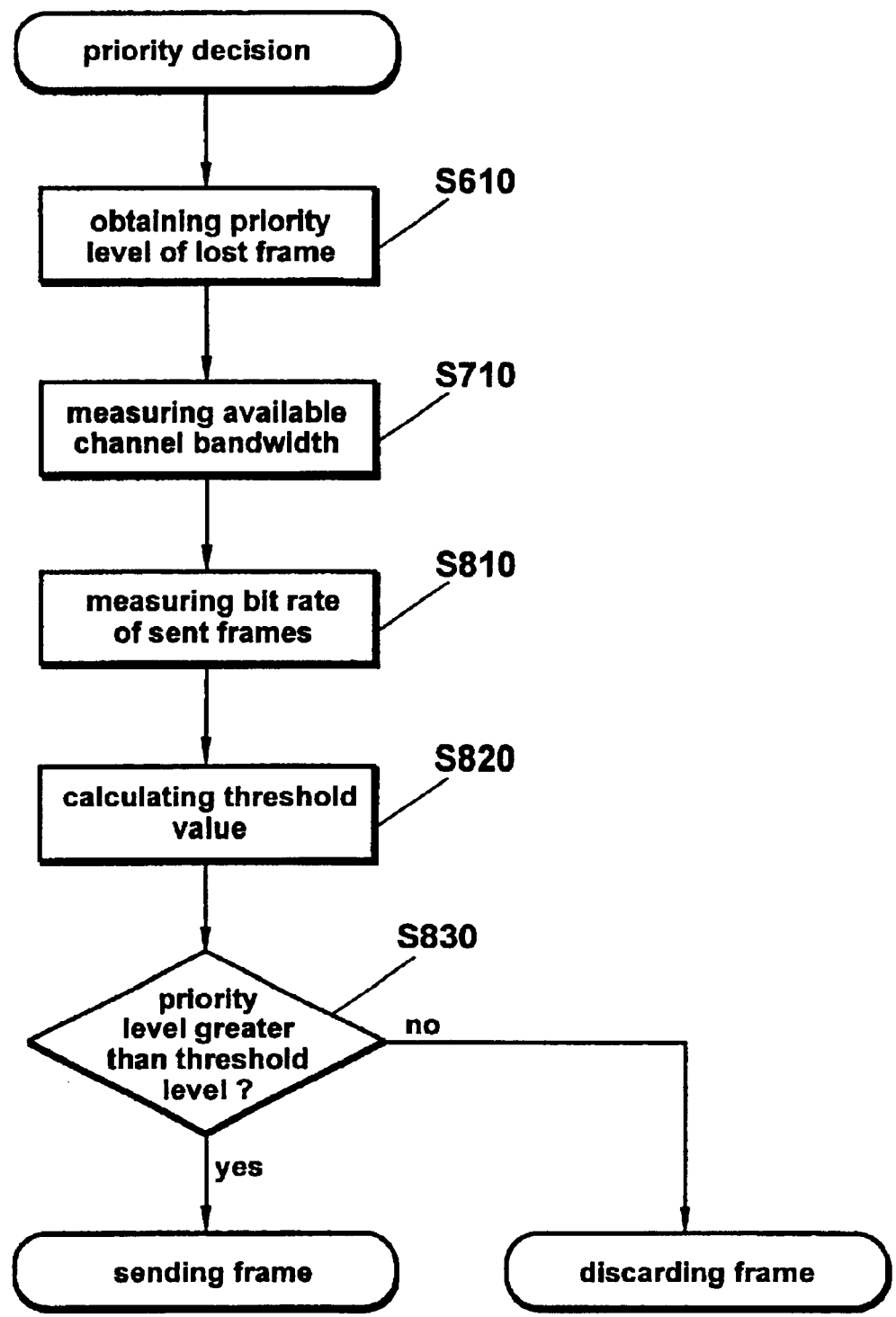
FIG. 8 is a flow chart illustrating a third example of the priority decision.

Yet another improvement of the priority decision process may be achieved as illustrated in FIG. 8 by additionally measuring the bit rate of the sent frames in step S810. This improvement is based on the discovery that with bad channel conditions, i.e. high bit error rates, the number of frames to be retransmitted increases. It is therefore advantageous to monitor the amount of data that was sent to ensure that enough channel bandwidth is reserved to transmit at least the important frames. To estimate the bit rate of sent frames, an average bit rate over a number of preceding frames which were sent is calculated according to the following equation:

$$B_s = \frac{\sum_{i=q}^{p} l_i}{t_q - t_p}.$$

In this equation, $B_s$ is the bit rate of the sent frames, p and q denote the oldest and the most recently sent frames, and $l_i$, $t_q$ and $t_p$ are the previously stored lengths in bits and transmission times of the respective frames.

Using the bit rate $B_s$ of sent frames measured in step S810, the priority threshold value $P_{th}$ is then calculated in step S820, similarly to the calculation described above:

$$P_{th} = k \cdot \frac{B_s}{B_{ch}}.$$

While the transmission mechanisms on the basis of a priority decision have been described together with an arrival time estimation, it will be appreciated by those of ordinary skill in the art that the mechanisms may likewise be used independently from each other.

Figure 9:
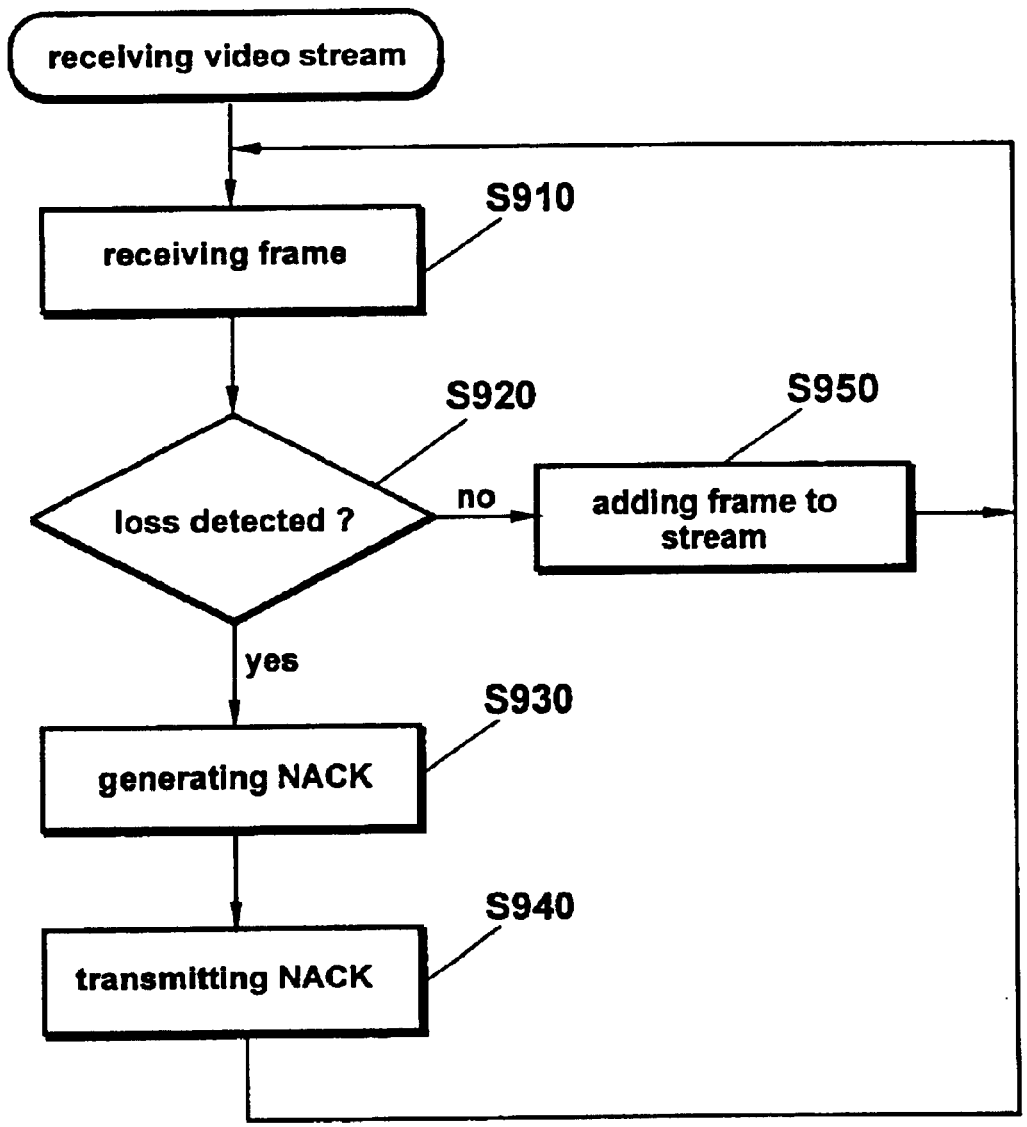
FIG. 9 is a flow chart illustrating the process of receiving a video stream.

FIG. 9 illustrates the process of receiving a video stream in video client 160. Upon detecting in step S920 that a video frame is missing, a retransmission request is generated and transmitted in steps S930 and S940 as described above. While in the preferred embodiment, the retransmission decision is performed by control unit 210 of video server 110, it will be appreciated by the skilled person that the decision whether a missing frame is to be retransmitted may likewise be performed at the receiver. For this purpose, the video client 160 would comprise a control unit (not shown) for calculating the priority threshold value and comparing the priority level of the missing frame with the threshold value. Only in case it is decided to retransmit the missing frame, a retransmission request would be sent from video client 160 to the video server 110. The retransmission decision step S440, illustrated in FIGS. 5 to 8, would then be incorporated into the process of receiving the video stream in FIG. 9 prior to the step S930 of generating a retransmission request.

What is claimed is:

1. A method for receiving data packets from a transmitter, said method comprising:

deciding that a data packet is missing;

making a retransmission decision, based on channel conditions, importance of the missing data packet and bit rates of previously received data packets, as to whether a retransmission request for the missing data packet is to be sent;

sending the retransmission request to the transmitter if the retransmission decision is affirmative; and receiving a packet retransmitted by the transmitter in response to the retransmission request.

2. The method according to claim 1, wherein the channel conditions include an available channel bandwidth.

3. The method according to claim 1, wherein the channel conditions include a channel transmission delay.

4. The method according to claim 1, wherein the channel conditions include a channel bit error rate.

5. The method according to claim 1, wherein the retransmission request is a NACK (non-acknowledgment) packet.

6. An apparatus for receiving data packets from a transmitter, said apparatus comprising:

a loss detection unit operable to decide that a data packet is missing and to make a retransmission decision, based on channel conditions, importance of the missing data packet and bit rates of previously received data packets, as to whether a retransmission request for the missing data packet is to be sent;

a transmitter buffer unit operable to send the retransmission request to the transmitter if said loss detection unit makes an affirmative retransmission decision; and a receiver buffer unit operable to receive the packet retransmitted by the transmitter in response to a retransmission request.

7. The apparatus according to claim 6, wherein the channel conditions include an available channel bandwidth.

8. The apparatus according to claim 6, wherein the channel conditions include a channel transmission delay.

9. The apparatus according to claim 6, wherein the channel conditions include a channel bit error rate.

10. The apparatus according to claim 6, wherein the retransmission request is a NACK (non-acknowledgment) packet.

* * * * *